(12) United States Patent
Sugimori et al.

(10) Patent No.: US 7,373,344 B2
(45) Date of Patent: May 13, 2008

(54) METHOD AND APPARATUS FOR DISPLAYING SYSTEM MANAGEMENT INFORMATION, COMPUTER PRODUCT FOR THE SAME, AND OPERATION MANAGEMENT SYSTEM

(75) Inventors: Hideo Sugimori, Kawasaki (JP); Masashi Ogawa, Kawasaki (JP); Hideki Nozaki, Kawasaki (JP); Seiya Shindo, Kawasaki (JP); Hiroshi Yazawa, Kawasaki (JP); Shinichi Doi, Nagoya (JP); Taisuke Aizawa, Kawasaki (JP); Ken Takahashi, Kawasaki (JP); Gaku Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 11/045,871

(22) Filed: Jan. 28, 2005

(65) Prior Publication Data

US 2006/0095428 A1 May 4, 2006

(30) Foreign Application Priority Data

Oct. 29, 2004 (JP) ............................. 2004-316631

(51) Int. Cl.
*G06F 17/30* (2006.01)

(52) U.S. Cl. ...................................... 707/6; 707/104.1
(58) Field of Classification Search .................... 707/6, 707/104.1; 705/26; 713/201
See application file for complete search history.

(56) References Cited

U.S. PATENT DOCUMENTS

| 2002/0016929 | A1* | 2/2002 | Harashima et al. .......... 713/201 |
| 2004/0172409 | A1* | 9/2004 | James ...................... 707/104.1 |
| 2005/0097008 | A1* | 5/2005 | Ehring et al. .................. 705/26 |
| 2006/0095428 | A1* | 5/2006 | Sugimori et al. ............... 707/6 |

FOREIGN PATENT DOCUMENTS

| JP | 7-230424 | 8/1995 |
| JP | 2000-207372 | 7/2000 |

* cited by examiner

*Primary Examiner*—John Cottingham
*Assistant Examiner*—Noosha Arjomandi
(74) *Attorney, Agent, or Firm*—Greer, Burns & Crain, Ltd.

(57) ABSTRACT

An apparatus for displaying system management information includes a combination storing unit that stores display pattern information that is obtained by combining, in subjective basis, system management information provided by a plurality of system management units; and a combination display unit that combines the system management information based on the display pattern stored in the combination storing unit, and displays the system management information combined.

7 Claims, 12 Drawing Sheets

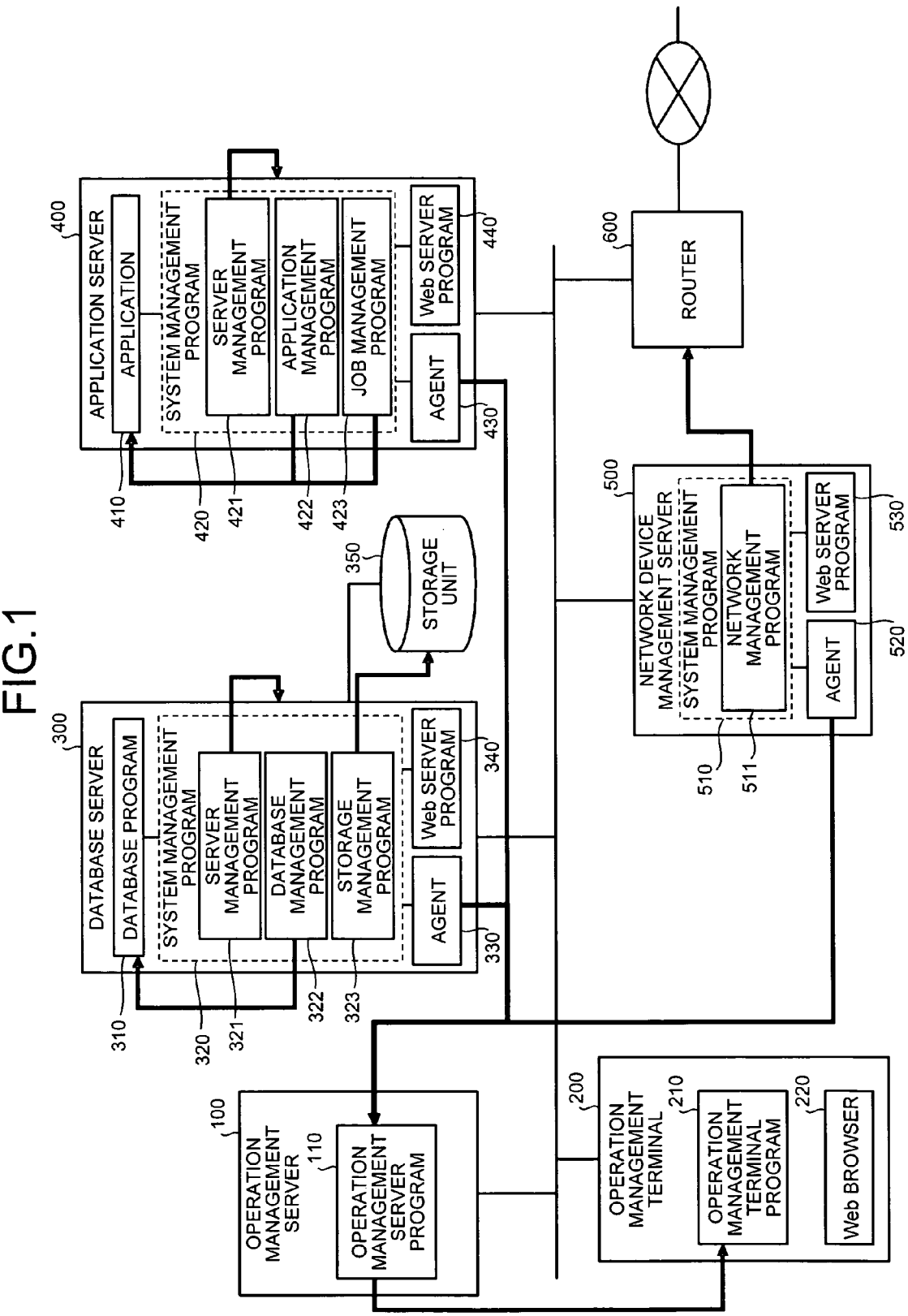

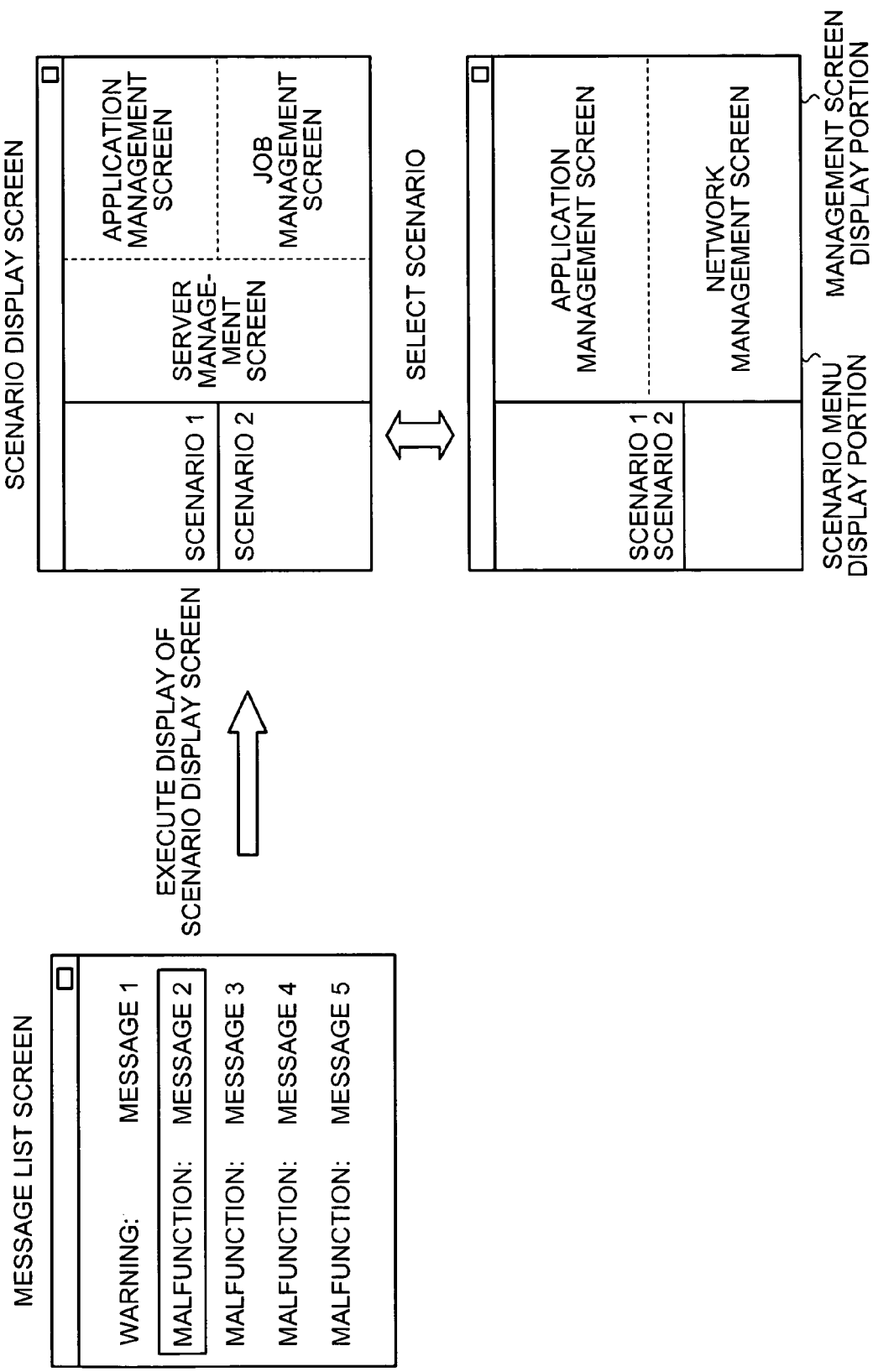

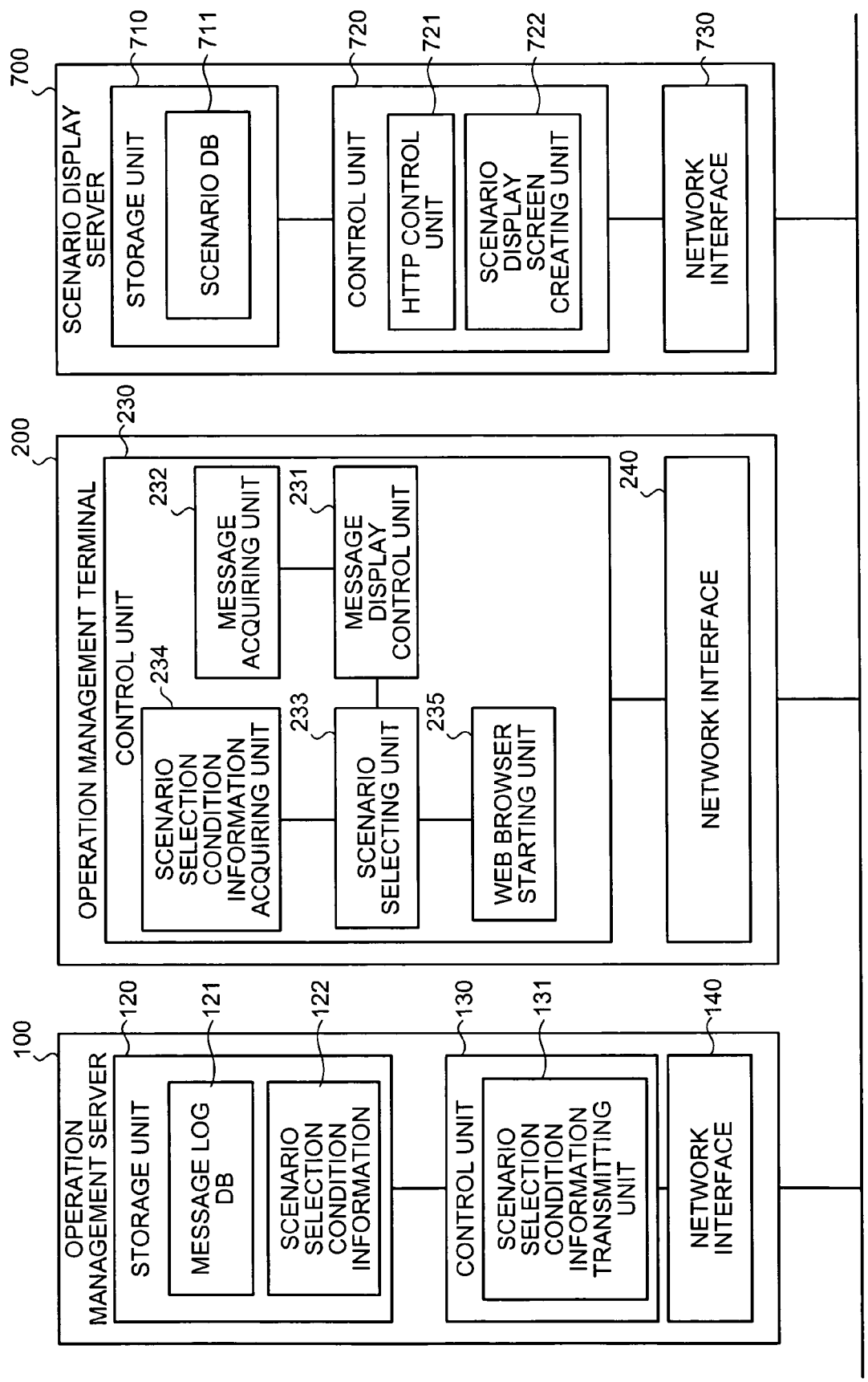

FIG.4

| ID | MESSAGE TEXT | LEVEL OF IMPORTANCE | TYPE | DATE AND TIME | HOST NAME | IP ADDRESS | MAC ADDRESS | APPLICATION NAME |
|---|---|---|---|---|---|---|---|---|
| 1001 | APPLICATION PROCESS IS TIME OUT. (host=baron,aplname=App01.exe) | MAL-FUNC-TION | APPLICATION MANAGEMENT | 20040823102345987 | baron | 192.168.0.110 | - | App01 |
| 1002 | COULD NOT PROCESS PERFORMANCE LIBRARY BECAUSE A TIME VIOLATION OCCURRED IN open FUNCTION. | WARNING | NETWORK MANAGEMENT | 20040823102351234 | - | 192.168.0.10 | XX:XX:XX:C0:30:9A:0C | - |
| 1003 | DISK WRITING PROCESS IS TIME OUT. (code=00034,DISK=sd0) | WARNING | STORAGE MANAGEMENT | 20040823103242432 | - | 192.168.0.55 | XX:XX:XX:86:02:4C:8A | - |
| ⋮ | ⋮ | ⋮ | ⋮ | ⋮ | ⋮ | ⋮ | ⋮ | ⋮ |

FIG.5

| TYPE | PRI-ORITY | KEYWORD | SCENARIO GROUP NAME |
|---|---|---|---|
| APPLICATION MANAGEMENT | 1 | %HOST%,%APPLICATION%,NETWORK | APPLICATION MANAGEMENT: NETWORK ERROR |
| | 2 | %HOST%,%APPLICATION%,TIME OUT | APPLICATION MANAGEMENT: PROCESS LOAD |
| | 3 | - | APPLICATION MANAGEMENT: GENERAL |
| NETWORK MANAGEMENT | 1 | - | NETWORK MANAGEMENT: GENERAL |
| ... | ... | ... | ... |

FIG.6

MESSAGE LIST SCREEN

| LEVEL OF IMPORTANCE | TYPE | DATE AND TIME | MESSAGE |
|---|---|---|---|
| MALFUNCTION | APP | 2004/08/23 10:23:45 | APPLICATION PROCESS IS TIME OUT... |
| WARNING | NET | 2004/08/23 10:23:51 | COULD NOT PROCESS PERFORMANCE LIBRARY BECAUSE A TIME VIOLATION OCCURRED IN open FUNCTION... |
| WARNING | STR | 2004/08/23 10:32:42 | DISK WRITING PROCESS IS TIME OUT... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |

SCENARIO DISPLAY... ~10

FIG.7

| SCENARIO GROUP NAME | DES-CRIP-TION | SCENARIO NAME | LAY-OUT TYPE | SCREEN NUM-BER | SCREEN NAME | URL | PARAMETER |
|---|---|---|---|---|---|---|---|
| APPLI-CATION MANAGE-MENT: NETWORK ERROR | xxxxxx | SERVER OPERATION INFORMATION | NO DIVI-SION | 1 | SERVER MANAGEMENT INFORMATION | http://192.168.0.10/srv_mng.cgi | HOST=%HOST%,TIME=%TIME% |
| | | NETWORK OPERATION INFORMATION | NO DIVI-SION | 1 | NETWORK MANAGEMENT INFORMATION | http://192.168.0.110/net_mng.cgi | IP=%IP% |
| | | APPLI-CATION OPERA-TION INFORMATION | VERTI-CAL 3 DIVI-SIONS | 1 | APPLICATION MANAGEMENT INFORMATION | http://192.168.0.10/apl_mng.cgi | HOST=%HOST%,TIME=%TIME% |
| | | | | 2 | JOB MANAGEMENT INFORMATION | http://192.168.0.10/job_mng.cgi | HOST=%HOST%,TIME=%TIME% |
| | | | | 3 | SERVER MANAGEMENT INFORMATION | http://192.168.0.10/srv_mng.cgi | HOST=%HOST%,TIME=%TIME% |
| APPLI-CATION MANAGE-MENT: PROCESS LOAD | xxxxxx | APPLI-CATION PERFOR-MANCE INFORMA-TION | VERTI-CAL 2 DIVI-SIONS | 1 | APPLICATION PERFORMANCE INFORMATION | http://192.168.0.10/apl_perf.cgi | APPLICATION=%APPLICATION% HOST=%HOST% |
| | | | | 2 | SERVER PERFORMANCE INFORMATION | http://192.168.0.10/srv_perf.cgi | HOST=%HOST% |
| ⋮ | ⋮ | ⋮ | ⋮ | ⋮ | ⋮ | ⋮ | ⋮ |

FIG.8

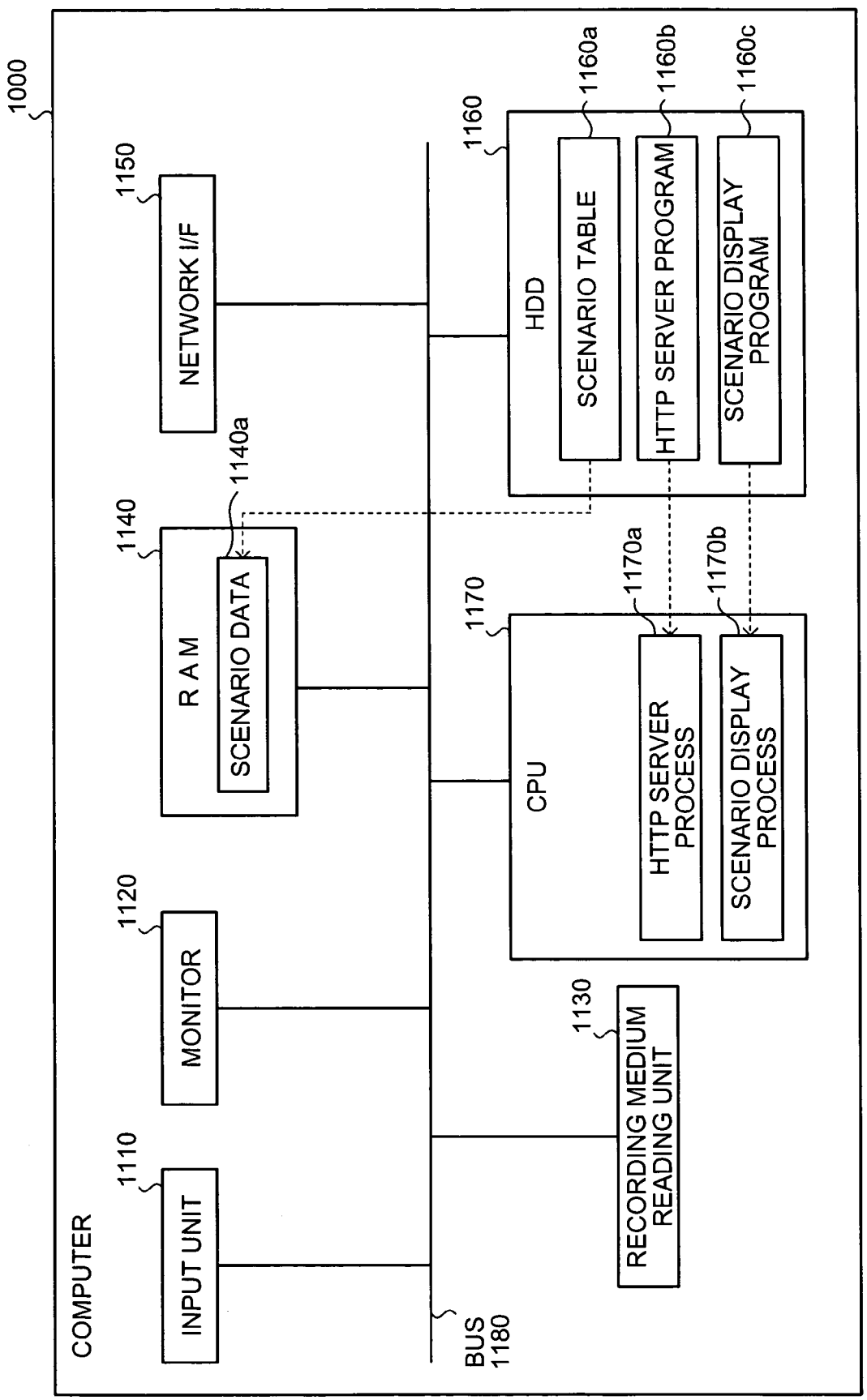

METHOD AND APPARATUS FOR DISPLAYING SYSTEM MANAGEMENT INFORMATION, COMPUTER PRODUCT FOR THE SAME, AND OPERATION MANAGEMENT SYSTEM

BACKGROUND OF THE INVENTION

1) Field of the Invention

The present invention relates to a method and apparatus for displaying system management information, a computer product for the same, and an operation management system, and more particularly, to a method and apparatus for displaying system management information, a computer product for the same, and an operation management system that can support a system manager to investigate a system when an error occurred, and provide a prompt settlement of the error.

2) Description of the Related Art

With a spread of a so-called open system, it is now popular to build an information processing system by combining hardware and software from a variety of vendors. In such a multi-vendor environment, a system manager is required to acquire a proficiency in operation systems uniquely provided by each of the hardware and the software, which is quite a big burden to the system manager.

To support the system manager to work in the multi-vendor environment, an operation management system has been developed, and is now widely in use, in which management of different hardware and software is performed in an integrated fashion using a unified system.

One of the significant functions of the operation management system is a message management function that collects a message to the system manager, which is output to a log and the like by the hardware or the software, and display the message on a monitor of an operation management terminal. With this function, the system manager can figure out an error occurred in all of the hardware and the software and a sign for the error with nothing other than observing the monitor of the operation management terminal.

A technology for such an operation management system is disclosed in, for example, Japanese Patent Application Laid Open Publication No. Hei-07-230424 and Japanese Patent No. 2000-207372.

However, the conventional operation management system has a drawback in supporting the system manager to work after recognizing an error occurred.

When an error or a sign for the error is displayed on the monitor of the operation management terminal, the system manager needs to perform an investigation to check a situation of the error occurrence and to figure out a reason of the error. Because the information collected by the operation management system is limited to basic information, the system manager must refer to information provided by the hardware or the software relating to the error to investigate details of the error. It is a difficult operation due to following two reasons.

The first reason is a difficult in selecting on object of the investigation. For example, when an error in an application response has occurred, it is necessary to check an operation status of the application by referring to a management display for management of the application, or to check a status of a central processing unit (CPU) or a memory by observing a management display for management of a server. At this moment, a kind of know-how is required to pick up information relating to the error from among various pieces of information provided by the hardware or the software in an appropriate manner.

The second reason is a difficult in accessing the object of the investigation. Even though the information to be investigated is successfully selected, the investigation is not possible without acquiring the information. As described earlier, because each of the hardware and the software has a unique management system, the system manager must obtain a mastery of a method of acquiring information according to each of the management systems.

If there is a missing in selecting the object of the investigation, or if there is a trouble in accessing the information on the object of the investigation, it becomes late to figure out a reason of the error, and as a result, it causes a delay in fixing up the error. A time-lag of the error may not only cause an inconvenience to a user, but also invite a loss of money. To avoid such a case, it is highly demanded for the operation management system to implement a function to support the system manager to work after recognizing an error occurred.

SUMMARY OF THE INVENTION

It is an object of the present invention to solve at least the above problems in the conventional technology.

An apparatus for displaying system management information according to one aspect of the present invention includes a combination storing unit that stores display pattern information that is obtained by combining, in subjective basis, system management information provided by a plurality of system management units; and a combination display unit that combines the system management information based on the display pattern stored in the combination storing unit, and displays the system management information combined.

A method of displaying system management information according to another aspect of the present invention includes acquiring display pattern information that is obtained by combining, in subjective basis, system management information provided by a plurality of system management units; combining the system management information based on the display pattern stored in the combination storing unit; and displaying the system management information combined.

A computer-readable recording medium according to still another aspect of the present invention stores a computer program that causes a computer to execute the above method according to the present invention.

An operation management system according to still another aspect of the present invention is built by connecting an operation management server that collects message information for a system management output from a plurality of system management units, an operation management terminal that displays the message information collected by the operation management server, and a scenario display server via a network. The operation management terminal includes a scenario selecting unit that selects, based on a predetermined rule, a scenario display screen most related to one of the message information displayed, from among a plurality of scenario display screens provided by the scenario display server; and a scenario-display-screen display requesting unit that requests the scenario display server to display the scenario display screen selected by the scenario selecting unit. The scenario display server includes a scenario storing unit that stores a scenario that is display pattern information obtained by combining, in subjective basis, system management information provided by the system management units; and a scenario display screen creating unit that creates a scenario display screen by combining the system management information based on the scenario stored in the scenario storing unit.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a schematic diagram for illustrating an example of an operation environment for an operation management system according to an embodiment of the present invention;

FIG. 2 is a schematic diagram for illustrating an outline of management screen display method for the operation management system according to the embodiment;

FIG. 3 is a block diagram for illustrating a configuration of the operation management system according to the embodiment;

FIG. 4 is a table of an example of a message log DB;

FIG. 5 is a table of an example of scenario selection condition information;

FIG. 6 is a table of an example of a message list screen;

FIG. 7 is a table of an example of a scenario DB;

FIG. 8 is a schematic diagram for illustrating an example of a scenario display screen;

FIG. 12 is a block diagram of a computer that executes a scenario display.

DETAILED DESCRIPTION

Figure 9:
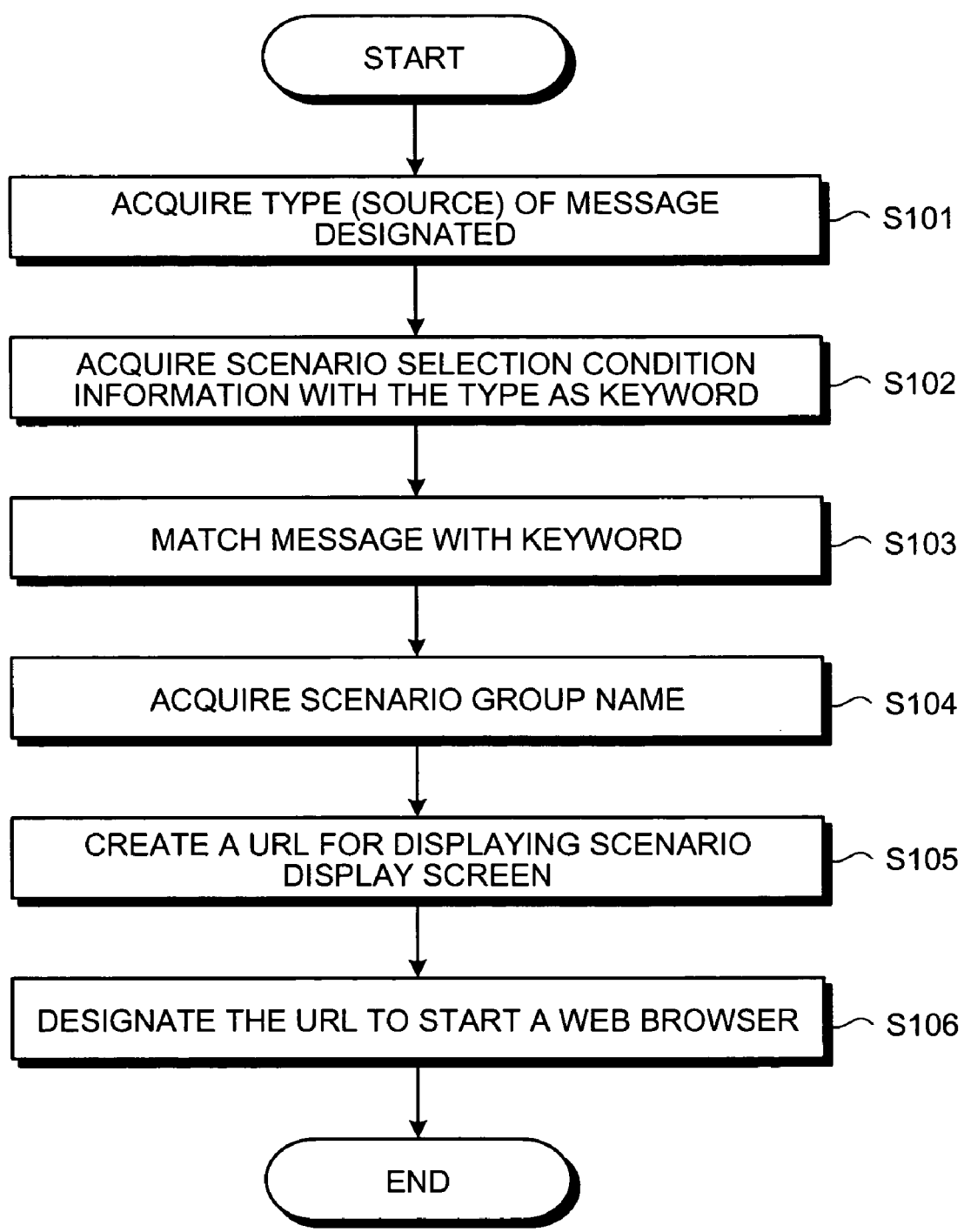
FIG. 9 is a flowchart of a process procedure for an operation management terminal shown in FIG. 3.

Exemplary embodiments of a system management information display program, a system management information display apparatus, a system management information display method, and an operation management system according to the present invention will be explained in detail below with reference to the accompanying drawings.

FIG. 1 is a schematic diagram for illustrating an example of an operation environment for an operation management system according to an embodiment of the present invention. The operation management system includes an operation management server 100, an operation management terminal 200, and a variety of servers, connected to each other via a network.

The operation management server 100 runs an operation management server program 110 that controls the whole operation management system. The operation management terminal 200 runs an operation management terminal program 210 that displays information transmitted from the operation management server program 110, and makes a request for executing various types of processes to the operation management server program 110. The operation management terminal 200 also runs a Web browser 220 to refer to a Web page.

A database server 300 runs a database program 310 that provides a database function. The database server 300 also runs a variety of system management programs 320, an agent 330, and a Web server program 340.

A server management program 321, one of the system management programs 320, performs monitoring and control of hardware and operation system (OS) of the database server 300. A database management program 322 performs monitoring and control of the database program 310. A storage management program 323 performs monitoring and control of a storage unit 350 that is a large capacity storage unit connected to the database server 300.

The agent 330 acquires a message for a system manager output to a log and the like from the database management program 322 and the storage management program 323, and transmits the message to the operation management server program 110. The Web server program 340 releases, to a network, a Web page and the like for the system manager provided by the server management program 321, the database management program 322, and the storage management program 323.

An application server 400 runs an application 410 that provides a variety of operation processes. The application server 400 also runs a variety of system management program 420, an agent 430, and a Web server program 440.

A server management program 421, one of the system management programs 420, performs monitoring and control of hardware and OS of the application server 400. An application management program 422 performs monitoring and control of the application 410. A job management program 423 performs monitoring and control of an execution schedule for various programs including the application 410.

The agent 430 acquires a message for a system manager output to a log and the like from the application management program 422 and the job management program 423, and transmits the message to the operation management server program 110. The Web server program 440 releases, to a network, a Web page and the like for the system manager provided by the server management program 421, the application management program 422, and the job management program 423.

A network device management server 500 manages a variety of network devices including a router 600, and runs a variety of system management programs 510, an agent 520, and a Web server program 530.

A network management program 511, one of the system management programs 510, performs monitoring and control of the variety of network devices including the router 600. The agent 520 acquires a message for a system manager output to a log and the like from the network management program 511, and transmits the message to the operation management server program 110. The Web server program 530 releases, to a network, a Web page and the like for the system manager provided by the network management program 511.

In this manner, in the operation environment described as an example so far, various system management programs are operated in the database server 300, the application server 400, and the network device management server 500. The message for the system manager output from the above servers is acquired by an agent of each of the servers, and transmitted to the operation management server program 110. The operation management server program 110 receives the message, and transmits the message to the operation management terminal program 210, after shaping the message. Then the operation management terminal program 210 outputs the message received to a monitor. With this mechanism, error information and warning information of all the servers are displayed in an integrated fashion on the monitor of the operation management terminal 200.

When details of the error information or the warning information is needed, the system manager can refer to Web pages provided by each of the system management programs by making an access to a Web server program provided by each of the system management programs using the Web browser 220 of the operation management terminal 200. However, because the Web pages are provided by each of the system management programs based on a unique specification, there is no unified rule for, for example, titling of uniform resource locator (URL).

FIG. 2 is a schematic diagram for illustrating an outline of management screen display method for the operation management system according to the embodiment.

As shown in the figure, a message list screen is always displayed on the monitor of the operation management terminal 200. Let us suppose that a message indicating that an error has occurred is output on the message list screen, so that it is necessary to perform a situation check.

In the past, when such a case happens, the system manger selects information that seems to be related to the error based on his or her own knowledge from a content of the message, and refers to the information using a Web browser and the like. With such a conventional method, important information relating to the error may be omitted, or the situation check may take some time due to a time consuming operation for referring to the information.

However, the operation management system according to the present invention automatically displays related information when such a case happens. More specifically, the operation management system according to the present invention determines a content of a message, automatically selects a scenario for an investigation, and displays the related information on a scenario display screen following the scenario.

As shown in FIG. 2, the scenario display screen is configured by dividing a Web browser screen into left and right frames, with the left frame as a scenario menu display portion and the right frame as a management screen display portion. A scenario list included in a scenario group selected based on the content of the message is displayed on the scenario menu display portion. By selecting one of the scenarios displayed, a display content of the management screen display portion is changed following the scenario selected.

The management screen display portion is divided by number and format defined in the scenario, and information for the investigation is displayed on each of a plurality of areas divided. For example, if the system manager selects a scenario 1 from the scenario menu display portion, the management screen display portion is divided into three areas, on each of which a server management screen, an application management screen, and a job management screen are displayed, respectively. Similarly, if the system manager selects a scenario 2 from the scenario menu display portion, the management screen display portion is divided into two areas, on each of which an application management screen and a network management screen are displayed, respectively.

In this manner, by selecting a scenario based on a content of a message and displaying a plurality of management screens simultaneously according to the scenario selected, the system manager can refer to all the necessary information without omission at once, and thereby promptly take a counter-measure to the error.

FIG. 3 is a block diagram for illustrating a configuration of the operation management system according to the embodiment. The operation management system includes an operation management server 100, an operation management terminal 200, and a scenario display server 700, connected to each other via a network. An agent that is operated on a variety of servers such as a database server, and transmits a variety of information to the operation management server 100 is also a part of the operation management system, although the agent is not shown in the figure.

The operation management server 100 controls the whole operation management system, and includes a storage unit 120, a control unit 130, and a network interface 140. The storage unit 120 stores a variety of information including a message log DB 121 and a scenario selection condition information 122.

The message log DB 121 is information in which messages for a system manager transmitted from agents on a variety of servers are accumulated. FIG. 4 is a table of an example of a message log DB 121. As shown in the figure, the message log DB 121 includes data items, such as ID, message text, level of importance, type, date and time, host name, IP address, MAC address, and application name.

The ID is an identification number to identify each of the data. The message text is a main body included in a message transmitted from the agent. The level of importance represents a seriousness of the data, with values "error", "warning", "notification", and "information" in order of high importance. The type indicates a source of the message, namely, a system management program from which the error has occurred. The date and time indicates date and time of occurrence of the error.

The host name, the IP address, the MAC address, and the application name indicate the host name, the IP address, the MAC address, and the application name of the source of the error, respectively, and only necessary items are set according to the type from among the above items.

The scenario selection condition information 122 contains a selection condition for selecting a scenario group that is displayed on a scenario display screen based on a content of a message. FIG. 5 is a table of an example of scenario selection condition information 122. As shown in the figure, the scenario selection condition information 122 includes data items, such as type, priority, key word, and scenario group name.

The type corresponds to a data item of the type in the message log DB 121, and becomes the first selection condition for selecting a scenario group from the content of the message. A combination of the priority, key word, and the scenario group name can be maintained for one type. The priority indicates an order of priority when a plurality of data is present to which the type and the key word make a hit.

The key word contains a phrase that is matched with the message text, and becomes the second selection condition for selecting the scenario group from the content of the message. When a plurality of phrases is set in the key word, it is assumed that the key word makes a hit only when all of the phrases are included in the message text. On the other hand, when nothing is set in the key word, it is assumed that the key word makes a hit all the time.

As the phrase, a variable that is converted into a value of a specific item in a message to be compared can be set in addition to a fixed character string. For example, a variable "% HOST %" is matched with the message text after being replaced by a value of an item of the host name in the message to be compared.

The scenario group name contains a title of a scenario group that is selected when the type and the key word makes a hit to the message.

The control unit 130 controls the whole operation management server 100, and includes a scenario selection condition information transmitting unit 131. The scenario selection condition information transmitting unit 131 is a processing unit that transmits the scenario selection condition information in response to a request from the operation management terminal 200. The network interface 140 is an interface for exchanging a variety of information via a network.

The message log DB 121, the scenario selection condition information 122, and the scenario selection condition information transmitting unit 131 are not necessarily to be arranged in the operation management server 100, but can be arranged in the operation management terminal 200, the scenario display server 700, or other server.

The operation management terminal 200 performs a display of information transmitted from the operation management server 100 or an execution request for processing to the operation management server 100, and includes a control unit 230 and a network interface 240.

The control unit 230 controls the whole operation management terminal 200, and includes a message display control unit 231, a message acquiring unit 232, a scenario selecting unit 233, a scenario selection condition information acquiring unit 234, and a Web browser starting unit 235.

The message display control unit 231 is a processing unit that outputs a message acquired from the operation management server 100 by the message acquiring unit 232 to a message list screen, and notifies an instruction received from a user of the screen to other processing unit such as the scenario selecting unit 233.

FIG. 6 is a table of an example of the message list screen. As shown in the figure, on the message list screen, level of importance, type, date and time, and a message are displayed in a list. These items are corresponding to the level of importance, the type, the date and time, and the message text in the message log DB 121, respectively. In this example, the type is displayed in a form of abbreviation, and the date and time is shaped in a format that is easy to recognize. By selecting a specific row from the list and pressing a scenario display button 10, a scenario display screen corresponding to the message selected is displayed.

The message acquiring unit 232 acquires information added to the message log DB 121, and delivers the information acquired to the message display control unit 232.

The scenario selecting unit 233 receives a notification that there is an instruction to display a scenario display screen and information on a content of a message designated by the instruction from the message display control unit 231, acquires information on a scenario group matching the content of the message from the scenario selection condition information 122, and selects a most suitable scenario group from among the scenario groups acquired.

The scenario selection condition information acquiring unit 234 makes a request for a transmission of information to the scenario selection condition information transmitting unit 131 based on an instruction from the scenario selecting unit 233, and delivers the information received to the scenario selecting unit 233.

More specifically, the scenario selection condition information acquiring unit 234 acquires information corresponding to the type designated by the scenario selecting unit 233 from the scenario selection condition information transmitting unit 131, and delivers the information acquired to the scenario selecting unit 233. The scenario selecting unit 233 performs a matching process for the key word and the message text in an order of priority using the information received, and selects a scenario group indicated by information that makes a first hit as a scenario group to be displayed on the scenario display screen.

The Web browser starting unit 235 creates an URL for displaying a scenario group selected by the scenario selecting unit 233, and starts the Web browser 220 with specifying the URL created. The URL created by the Web browser starting unit 235 is, for example, in the following format.

http://host name of the scenario display server 700/CGI name for calling a function of a scenario display screen creating unit 722? scenario=name of the scenario group selected & property information of the message that led to a display of the scenario display screen The network interface 240 is an interface for exchanging a variety of information via a network.

The scenario display server 700 performs a creation of a scenario display screen, and includes a storing unit 710, a control unit 720, and a network interface 730. The storing unit 710 is a storing unit for storing a variety of information, and stores a scenario DB 711.

The scenario DB 711 contains scenario information to be displayed on the scenario display screen. FIG. 7 is a table of an example of a scenario DB 711. As shown in the figure, the scenario DB 711 includes data items, such as scenario group name, description, scenario name, layout type, screen number, screen name, URL, and parameter.

The scenario group name corresponds to the scenario group name in the scenario selection condition information 122, and is a name for identifying a scenario group that performs a batch management of a plurality of scenarios. The description corresponds to the scenario group name in one-to-one manner, and contains precautions and the like for manipulating the scenario display screen.

The scenario name is a name for identifying a scenario that is a group that performs a batch management of management screens displayed simultaneously on a management screen display portion of the scenario display screen. The scenario corresponds to a sub-group of the scenario group, and a plurality of scenario names can be set for one scenario group name. The layout corresponds to the scenario name in one-to-one manner, and represents a display layout of management screens included in the scenario. The layout is set by selecting one of a plurality of layouts defined in advance.

A plurality of combinations of the screen number, the screen name, the URL, and the parameter can be set for one scenario name. These combinations represent an individual management screen displayed on the management screen display portion of the scenario display screen. The screen number indicates a display position on the management screen display portion. The screen name is a name for identifying a management screen. The URL is an address based on which the management screen is displayed.

The parameter contains optional data added to the URL to display the management screen. A part of the optional data is set as a variable in the parameter, and when the optional data is added to the URL, the scenario display screen creating unit 722 performs a conversion of the variable. For example, if a value of

HOST=% HOST %, TIME=% TIME % is set in the parameter, a value of the host name of a message that led to a display of the scenario display screen is "host01", and a value of the date and time is "20040923103721", the value in the parameter is converted into a form of HOST=host01&TIME=20040923103721.

The control unit 720 controls the whole scenario display server 700, and includes a hypertext transfer protocol (HTTP) control unit 721 and the scenario display screen creating unit 722.

Figure 8:
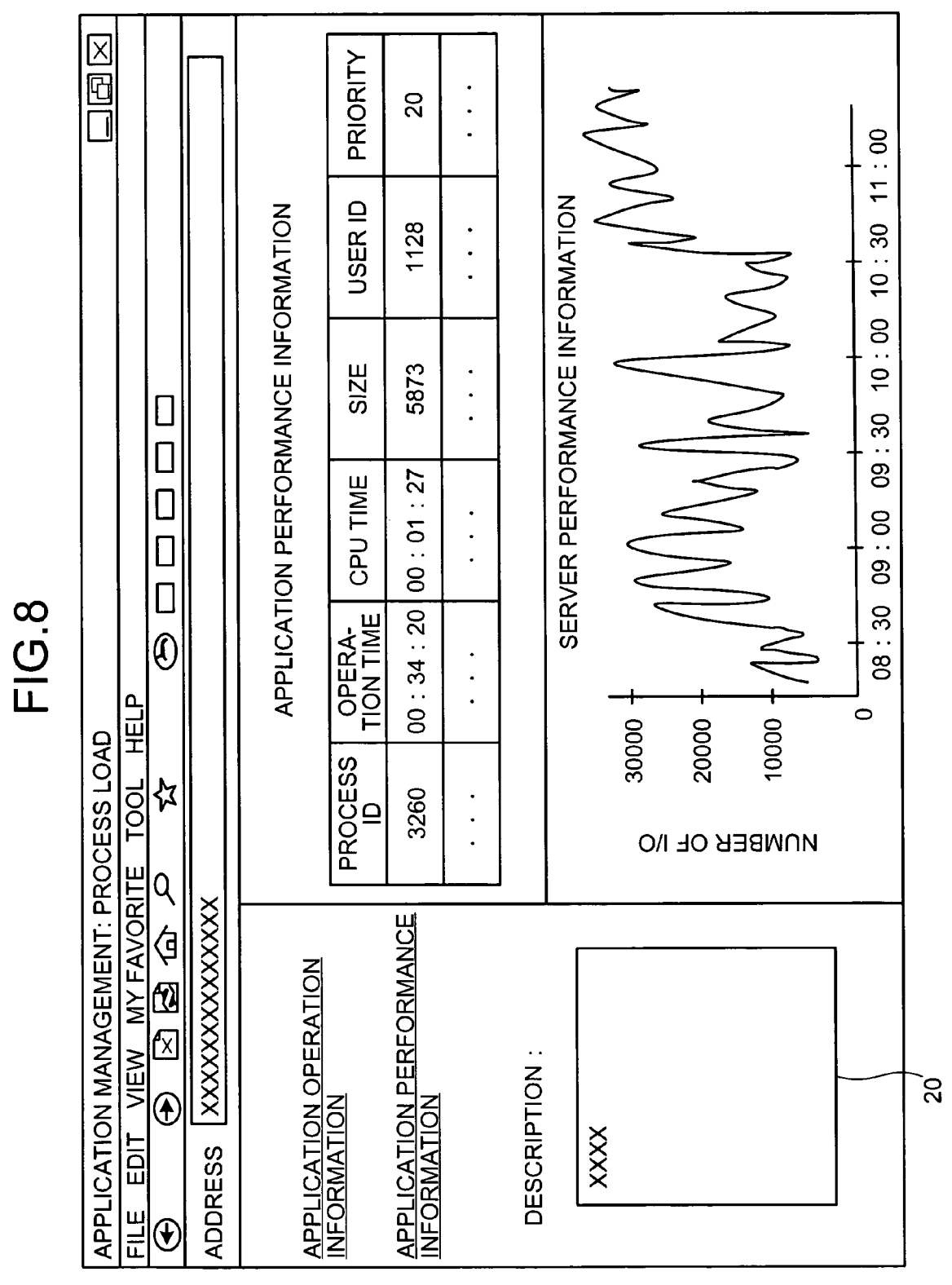

The HTTP control unit 721 is a processing unit that provides a Web server function. The scenario display screen creating unit 722 is a processing unit that creates a Web page to display a scenario display screen. FIG. 8 is a schematic diagram for illustrating an example of a scenario display screen.

The figure illustrates a screen that displays the scenario group called "APPLICATION MANAGEMENT: PROCESS LOAD" in the scenario DB shown in FIG. 7. On the upper part of the scenario menu display portion, two scenarios belonging to the scenario group, a scenario called "APPLICATION OPERATION INFORMATION" and a scenario called "APPLICATION PERFORMANCE INFORMATION" are displayed, which can be optionally selected. On the lower part of the scenario menu display portion, a description field 20 is provided, on which a value set in a data item of the description of the scenario group called "APPLICATION MANAGEMENT: PROCESS LOAD" is displayed.

When one of the "APPLICATION. OPERATION INFORMATION" and "APPLICATION PERFORMANCE INFORMATION" is selected on the scenario menu display portion, a content of the management screen display portion is changed. FIG. 8 illustrates a case when the "APPLICATION PERFORMANCE INFORMATION" is selected, in which two screens called "APPLICATION PERFORMANCE INFORMATION" and "SERVER PERFORMANCE INFORMATION" are displayed. In this case, the two management screens displayed are not created by the scenario display screen creating unit 722, but are requested for creation and transmission by a Web browser to an application server and the like based on an URL that is embedded into a frame by the scenario display screen creating unit 722.

In this manner, the scenario display screen creating unit 722 dynamically performs the creation of the scenario display screen based on a parameter specified at a time of starting a process and information in the scenario DB 711. A plurality of management screens to be investigated is simultaneously displayed on the scenario display screen. Therefore, a system manager can obtain all the necessary information by referring to the scenario display screen.

The network interface 730 is an interface for exchanging a variety of information via a network.

FIG. 9 is a flowchart of a process procedure for an operation management terminal 200 shown in FIG. 3.

When a specific message is selected from a message list screen that is displayed by the operation management terminal 200, and if there is an instruction to display detailed information relating to the message, the message display control unit 231 receives the instruction, and notifies the instruction received to the scenario selecting unit 233.

The scenario selecting unit 233, after receiving the instruction from the message display control unit 231, acquires a value of an data item in the type indicating a source of the message selected (Step S101), and instructs the scenario selection condition information acquiring unit 234 to acquire information of which the value of the type matches from the scenario selection condition information 122 (Step 102).

Subsequently, the information acquired is selected one by one in an order of priority, and the information selected is checked whether the key word is matched with the message text of the message (Step S103). When there is information matched, a scenario group name included in the information is adopted as a name of a scenario to be displayed (Step S104).

Then, an URL for displaying the scenario display screen is created using an address of a scenario display server, the scenario group name adopted at the Step S104, and values of various data items in the message selected (Step S105), and an instruction is sent to the Web browser starting unit 235 to start a Web browser with specifying the URL created (Step S106).

In this manner, the operation management terminal 200 selects a scenario group corresponding to a message selected, and starts a Web browser to display a scenario display screen corresponding to the scenario group selected.

Figure 10:
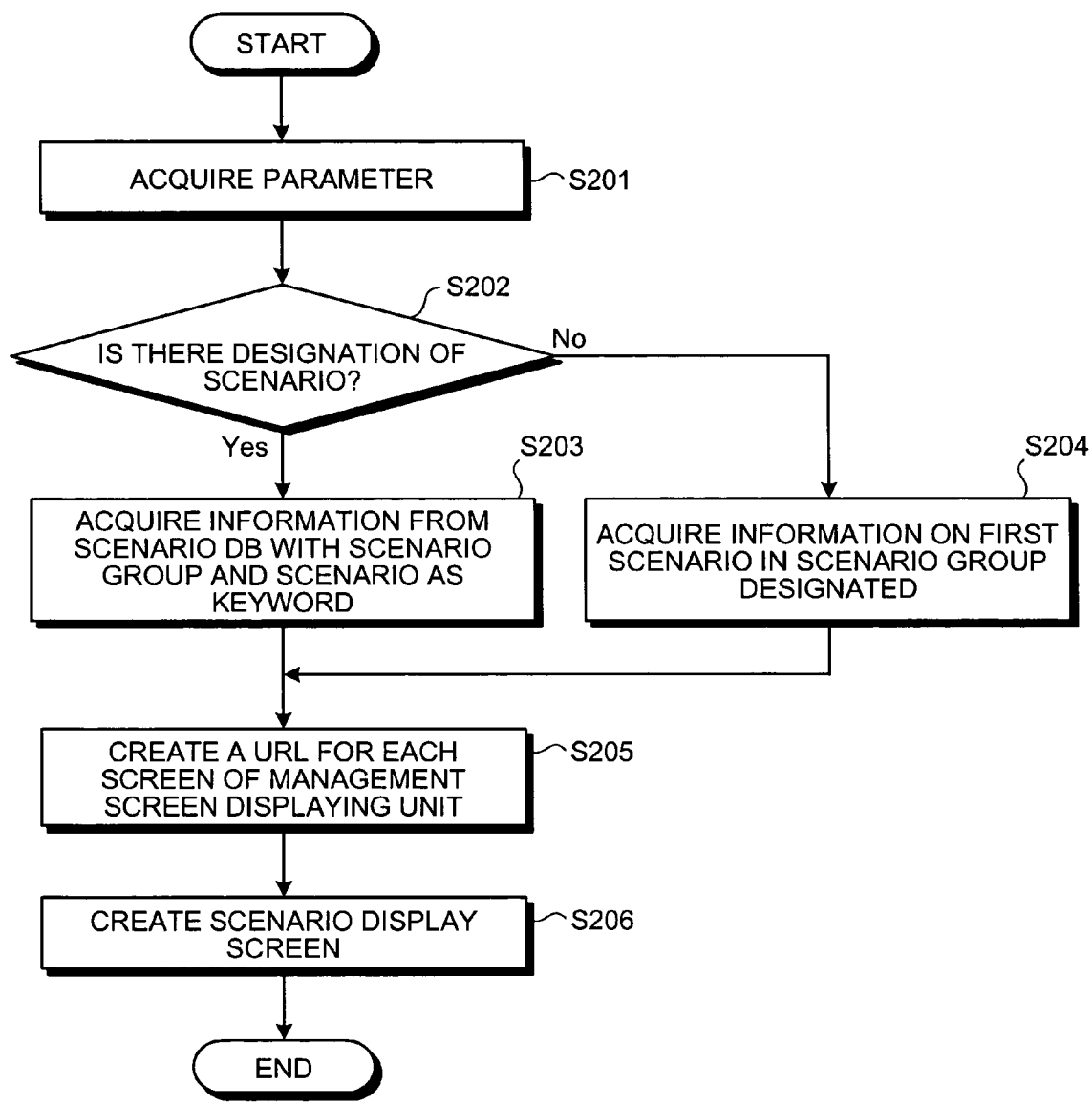
FIG. 10 is a flowchart of a process procedure for a scenario display server shown in FIG. 3.

FIG. 10 is a flowchart of a process procedure for a scenario display server 700 shown in FIG. 3. The HTTP control unit 721, upon receiving a request for performing creation and transmission of a scenario display screen from a Web browser, calls the scenario display screen creating unit 722 to deliver the request received with a variety of parameters included therein. The call of the scenario display screen creating unit 722 is implemented by using mechanism for calling a CGI included in the HTTP control unit 721.

The scenario display screen creating unit 722 called extracts the variety of parameters from the request received (Step S201), and checks if there is a designation of a scenario to display.

When there is a designation of a scenario ("YES" at Step S202), a name of the scenario designated and a scenario group name included in the parameter are taken as keys, and a scenario for which the two keys are matched is acquired from the scenario DB 710 (Step S203). This is an operation performed when one of the scenarios is selected at the scenario menu display portion of the scenario display screen. When one of the scenarios is selected at the scenario menu display portion of the scenario display screen, information indicating the scenario selected is included in the parameter, and the scenario display screen creating unit 722 determines a screen to display on the management screen display portion by referring to the information.

On the other hand, when there is no designation of a scenario ("NO" at Step S202), the scenario group name included in the parameter is taken as a key, and the first scenario for which the scenario group name is matched is acquired from the scenario DB 710 (Step S204). This is an operation performed when a message is selected from the message list screen of the operation management terminal 200, and when there is an instruction to display a scenario display screen relating to the message. In this case, because information indicating the scenario selected is not included in the parameter, the scenario display screen creating unit 722 assumes that the first scenario for which the scenario group name is matched is selected, and determines a screen to display on the management screen display portion.

Once the scenario to display on the management screen display portion is determined, an URL for displaying a management screen on each of the frames of the management screen display portion is created (Step S205), and a scenario display screen is created using the URL created (Step S 206). Then, finally, the HTTP control unit 721 transmits screen data to the Web browser from which the request is received to complete the process.

In this manner, the scenario display server 700 receives a request for displaying a scenario display screen, creates a scenario display screen corresponding to the request, and responds to a Web browser from which the request is received.

The series of processes described above can be implemented by executing a computer program prepared in advance on a computer. Following is an explanation of a computer program to implement the operation management system according to the present invention on a computer.

Figure 11:
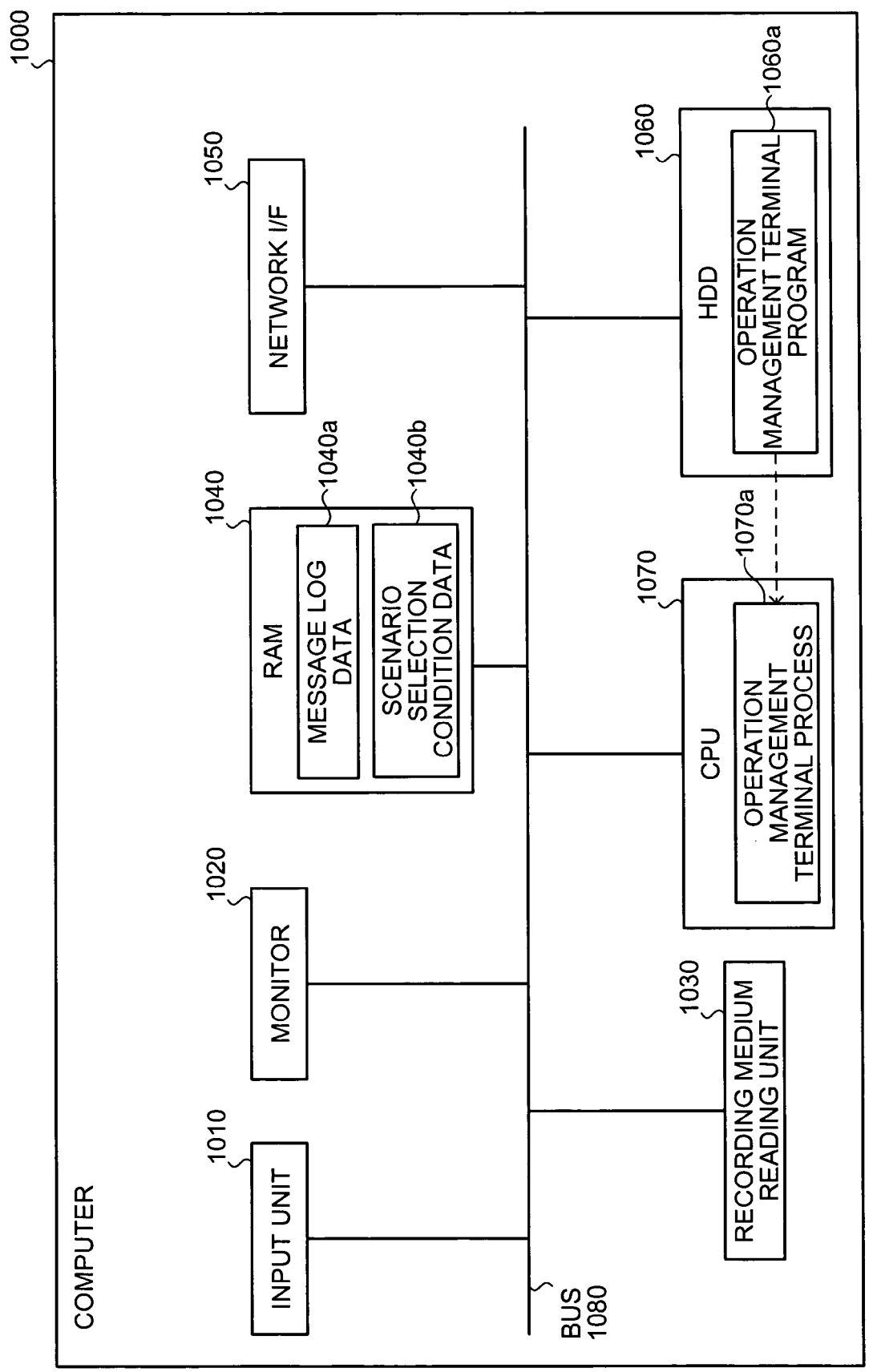
FIG. 11 is a block diagram of a computer that executes an operation management terminal program.

FIG. 11 is a block diagram of a computer that executes an operation management terminal program. A computer 1000 is configured by connecting an input unit 1010 that receives an input of data from a user, a monitor 1020, recording medium reading unit 1030 that reads a program from a recording medium that stores a variety of programs, a random access memory (RAM) 1040 that temporarily stores a variety of information, a network interface 1050 that performs exchange of data with other computer via a network, a hard disk drive (HDD) 1060, and a central processing unit (CPU), via a bus 1080.

The HDD 1060 stores an operation management terminal program 1060a that possesses a same function as that of the operation management terminal 200. The CPU 1070 reads the operation management terminal program 1060a from the HDD 1060, and executes the program read, thereby the program becomes to work as an operation management terminal process 1070a. The operation management terminal process 1070a corresponds to the control unit 220 shown in FIG. 3.

Furthermore, the CPU 1070 acquires data relating to messages collected by the operation management server 100 and data relating to selection of the scenario group, stores the data in the RAM 1040 as message log data 1040a and scenario selection condition data 1040b, and executes various data processing based on the message log data 1040a and the scenario selection condition data 1040b stored in the RAM 1040.

FIG. 12 is a block diagram of a computer that executes a scenario display. A computer 1100 is configured by connecting an input unit 1110, a monitor 1120, a recording medium reading unit 1130, a RAM 1140, a network interface 1150, a HDD 1160, and a CPU 1170, via a bus 1180.

The HDD 1160 stores a scenario display program 1160c that possesses a same function as that of the scenario display server 700. The HDD 1160 also stores a scenario table 1160a that corresponds to the scenario DB 711 shown in FIG. 3 and an HTTP server program 1160b that has a function of a Web server.

The scenario table 1160a, the HTTP server program 1160b, and the scenario display program 1160c may be integrated or separated as desired to be stored.

The CPU 1170 reads the scenario display program 1160a from the HDD 1160, and executes the program read, thereby the program becomes to work as a scenario display process 1170b. The scenario display process 1170b corresponds to the scenario display screen creating unit 722 shown in FIG. 3.

Furthermore, the CPU 1170 reads the HTTP server program 1160b from the HDD 1160, and executes the program read, thereby the program becomes to work as an HTTP server process 1170a. The HTTP server process 1170a corresponds to the HTTP control unit 721 shown in FIG. 3.

Moreover, the CPU 1170 reads a variety of data relating to a scenario displayed on the scenario display screen from the scenario table 1160a in the HDD 1160, stores the data read in the REAM 1140 as scenario data 1140a, and executes various data processing based on the scenario data 1140a stored in the RAM 1140.

The operation management terminal program 1060a, the HTTP server program 1160b, and the scenario display program 1160c are not necessarily to be stored in the HDD 1060 or the HDD 1160, but can be stored in a recording medium, such as a compact disk-read only memory (CD-ROM). Then, the computer 1000 or the computer 1100 may read the programs stored in the recording medium, and execute the programs read.

In addition, the programs may be stored in other computer (or server) that is connected to the computer 1000 or the computer 1100 via a public line, the internet, a local area network (LAN), or a wide area network (WAN) so that the computer 1000 or the computer 1100 reads the programs from the other computer (or server), and executes the programs read.

As described above, according to the present embodiment, an operating management terminal automatically selects a scenario display screen most related to a message displayed, and a scenario display server displays the scenario display screen selected in such a manner that a plurality of pieces of system management information is displayed together. Therefore, when a message indicating an error is displayed on the operation management terminal, it is possible to display the system management information related to the error accurately and promptly with an omission.

Furthermore, according to the present invention, although a combination of an operation management terminal and a scenario display server according to the present invention is used, the scenario display server can also be used independently.

When the scenario display server according to the present invention is used independently, a system manager can display a scenario display screen according to need by preparing a menu screen and the like for searching the scenario display screen. Namely, when an error occurs, it is possible to display necessary information promptly without an omission.

Moreover, according to the present embodiment, although management information provided by a variety of system management programs is referred to using a Web browser, other means than the Web browser may be used to refer to the management information.

A combination acquiring procedure, a combination displaying procedure, a combination storing unit, a combination displaying unit, a combination acquiring step, and a combination displaying step described in the claims and the following notes correspond to the scenario display screen creating unit 722 according to the present embodiment. Similarly, a system management information displaying program corresponds to the control unit 720 according to the present embodiment, and a system management information displaying unit corresponds to the scenario display server 700 according to the present embodiment.

According to the present invention, a display pattern of system management information is created in subjective basis in advance, and when necessary, a designation of the display pattern displays a plurality of pieces of system management information simultaneously as defined in the display pattern. As a result, it is possible to promptly display necessary information without an omission when an error has occurred.

Furthermore, according to the present invention, since a combination of the system management information is displayed on a Web browser, which is a means to promptly display information, it is possible to simplify the whole system without an independent display unit.

Moreover, according to the present invention, an operation management terminal automatically selects a scenario display screen that is most related to a message displayed by the operation management terminal, and a scenario display server displays the scenario display screen selected so that a plurality of pieces of system management information is displayed simultaneously. As a result, when a message indicating an error is displayed on the operation management terminal, it is possible to promptly display the system management information relating to the error without a mistake and an omission.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An operation management system comprising: a storing unit that stores a plurality of display pattern information, wherein each of the display pattern information designates a combination of system management information provided by a plurality of system management units, and corresponds to both a type of one of the system management units and an objective of displaying the system management information: an acquiring unit that acquires a message that indicates an operating condition of any of the system management units; a first displaying unit that displays the message acquired; a selecting unit that selects a display pattern information from the display pattern information stored in the storing unit, wherein the type corresponding to the display pattern information selected matches the type of any of the system management units, and the objective corresponding to the display pattern information selected matches the message acquired; and a second displaying unit that combines the system management information designated by the display pattern information selected, and displays the system management information combined.

2. The operation management system according to claim 1, wherein the second displaying unit makes a Web browser display the system management information that is combined.

3. The operation management system according to claim 1, wherein the selecting unit selects the display pattern information by matching a keyword corresponding to the objective with the message acquired.

4. The operation management system according to claim 1, wherein the second displaying unit displays a plurality of combinations of the system management information by switching one combination to another combination.

5. An apparatus for displaying system management information comprising: a memory; a processor; an information acquiring unit that acquires information about a plurality of display pattern information, wherein each of the display pattern information designates a combination of system management information provided by a plurality of system management units, and the information indicates that each of the display pattern information is corresponding to both a type of one of the system management units and an objective of displaying the system management information; a message acquring unit that acquires a message that indicates an operating condition of any of the system management units; a first displaying unit that displays the message acquired; a selecting unit that selects a display pattern information based on the information acquired by the information acquiring unit, wherein the type corresponding to the display pattern information selected matches the type of the any of the system management units, and the objective corresponding to the display pattern information selected matches the message acquired; and a second displaying unit that combines the system management information designated by the display pattern information selected, and displays the system management information that is combined.

6. A method of displaying system management information comprising:
acquiring a message that indicates an operating condition of any of a plurality of system management units;
displaying the message acquired;
acquiring information about a plurality of display pattern information, wherein each of the display pattern information designates a combination of system management information provided by the system management units, and the information indicates that each of the display pattern information is corresponding to both a type of one of the system management units and an objective of displaying the system management information;
selecting a display pattern information based on the information acquired, wherein the type corresponding to the display pattern information selected matches the type of any of the system management units, and the objective corresponding to the display pattern information selected matches the message acquired;
combining the system management information designated by the display pattern information selected; and
displaying the system management information that is combined.

7. A computer-readable storage medium that stores thereon a computer program for displaying system management information, wherein the computer program executes: acquiring a message that indicates an operating condition of any of a plurality of system management units; displaying the message acquired; acquiring information about a plurality of display pattern information, wherein each of the display pattern information designates a combination of system management information provided by the system management units, and the information indicates that each of the display pattern information is corresponding to both a type of one of the system management units and an objective of displaying the system management information; selecting a display pattern information based on the information acquired, wherein the type corresponding to the display pattern information selected matches the type of any of the system management units, and the objective corresponding to the display pattern information selected matches the message acquired; combining the system management information designated by the display pattern information selected; and displaying the system management information that is combined.

* * * * *